United States Patent
Veloso et al.

(10) Patent No.: US 10,827,070 B1
(45) Date of Patent: *Nov. 3, 2020

(54) SYSTEMS AND METHODS FOR OPTIMIZING PERFORMANCE METRICS FOR CONTACT CENTERS

(71) Applicant: Talkdesk, Inc., San Francisco, CA (US)

(72) Inventors: António Veloso, Lisbon (PT); Alexandre Pinheiro, Lisbon (PT)

(73) Assignee: TALKDESK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/668,277

(22) Filed: Oct. 30, 2019

Related U.S. Application Data

(63) Continuation of application No. 16/666,492, filed on Oct. 29, 2019.

(51) Int. Cl.
*H04M 3/523* (2006.01)
*H04M 3/51* (2006.01)
*G06Q 10/06* (2012.01)
*G06Q 30/00* (2012.01)

(52) U.S. Cl.
CPC ....... *H04M 3/5175* (2013.01); *H04M 3/5232* (2013.01)

(58) Field of Classification Search
CPC ............. H04M 3/5233; H04M 3/5175; H04M 2203/402; G06Q 10/063112

USPC ........... 379/265.03, 265.12, 265.11, 265.06, 379/265.05, 265.01

See application file for complete search history.

(56) References Cited

U.S. PATENT DOCUMENTS

| | | | | |
|---|---|---|---|---|
| 10,284,723 | B1* | 5/2019 | Neuer, III | H04M 3/5175 |
| 2008/0019500 | A1* | 1/2008 | Torres | H04M 3/5237 |
| | | | | 379/265.02 |
| 2015/0117632 | A1* | 4/2015 | Konig | H04M 3/5166 |
| | | | | 379/265.12 |

* cited by examiner

*Primary Examiner* — Thjuan K Addy

(57) ABSTRACT

In one embodiment, one or more performance metrics for communication queues are monitored. The performance metrics may include metrics such as wait time, abandonment rate, and customer survey scores. Communications are retrieved from the queues and provided to agents based on rules associated with each queue. When a monitored performance metric for a queue falls below a threshold, the system determines one or more attributes of the rule associated with the queue that could be changed or removed to improve the performance metric. The determined attributes may be made based on the number of agents that will be available to handle communications from the queue after the attributes are changed, and historical performance metric data collected about the queue and agents that handled communications for the queue. The proposed changes to the rule may be presented to an administrator who may either accept or reject the proposed changes.

20 Claims, 9 Drawing Sheets

300

600

SYSTEMS AND METHODS FOR OPTIMIZING PERFORMANCE METRICS FOR CONTACT CENTERS

CROSS-REFERENCE TO RELATED APPLICATIONS

This application is a continuation of U.S. patent application Ser. No. 16/666,492 filed on Oct. 29, 2019, entitled "SYSTEMS AND METHODS FOR OPTIMIZING PERFORMANCE METRICS FOR CONTACT CENTERS." The contents of which are hereby incorporated by reference.

BACKGROUND

In a contact center, communications are received and routed to available agents. One common way to route communications to agents, is to place agents in different queues that each correspond to a different communication topic or subject matter. For example, agents that that are to handle technical support communications may be placed in the technical support queue and agents that are to handle billing questions may be placed in the billing queue. When a communication is received with a billing question the next agent in the billing queue is selected to handle the communication.

However, there are drawbacks associated with this approach. Using agent queues may result in an inefficient use of agent resources. For example, a contact center may receive many billing related communications and therefore the billing queue may be empty. However, there may be many agents in the technical support queue who would be able to handle the communications, but because they are not in the billing queue, they are idle.

SUMMARY

In one embodiment, one or more performance metrics for communication queues are monitored. The performance metrics may include metrics such as wait time, abandonment rate, and customer survey scores. Communications are retrieved from the queues and provided to agents based on rules associated with each queue. When a monitored performance metric for a queue falls below a threshold, the system determines one or more attributes of the rule associated with the queue that could be changed or removed to improve the performance metric. The determined attributes may be made based on the number of agents that will be available to handle communications from the queue after the attributes are changed, and historical performance metric data collected about the queue and agents that handled communications for the queue. The proposed changes to the rule may be presented to an administrator who may either accept or reject the proposed changes.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described within a cloud-based contact center, it will become evident to those skilled in the art that the implementations are not limited thereto.

Figure 1:
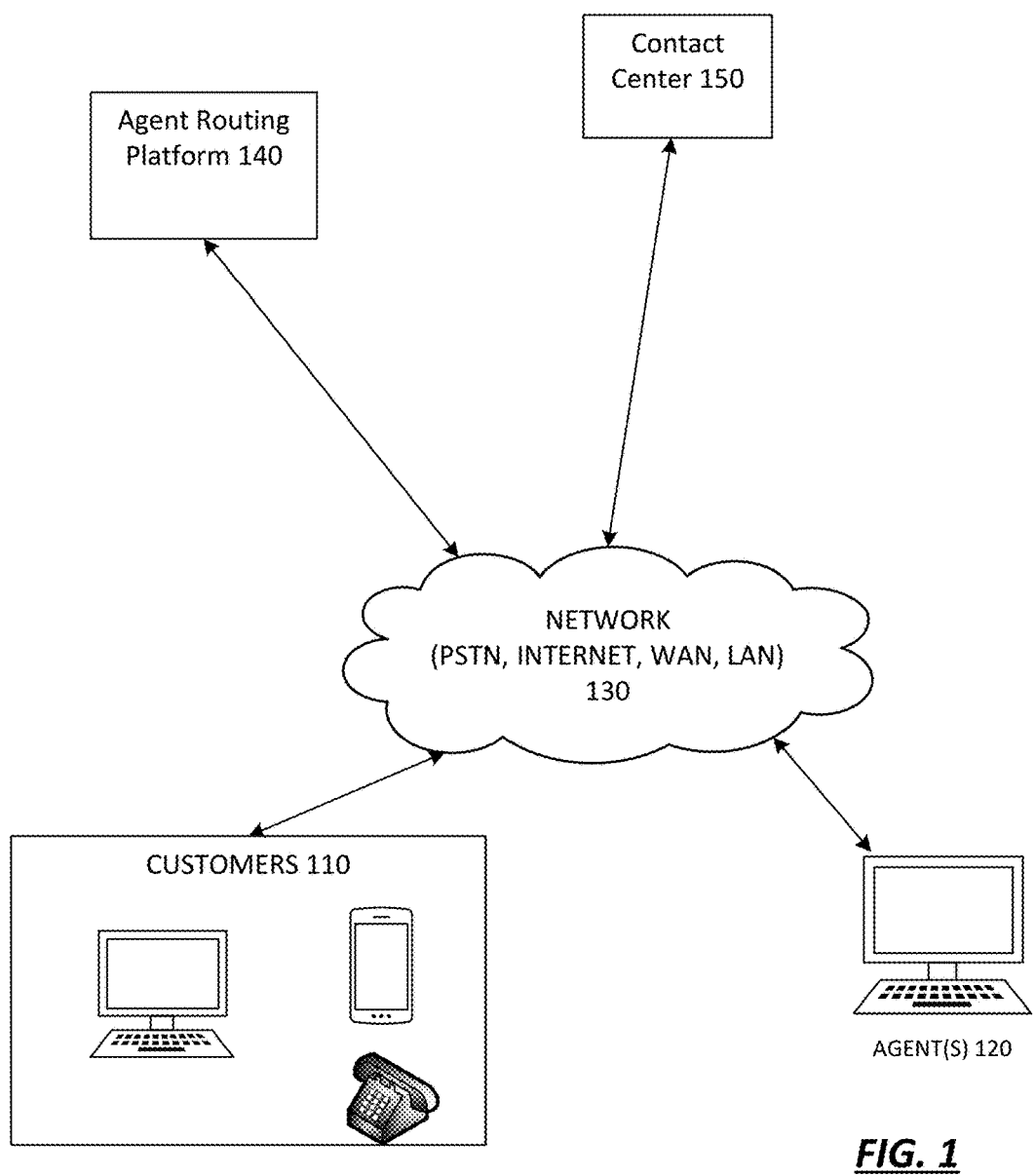
FIG. 1 is an illustration of an example system architecture.

FIG. 1 is an example system architecture 100, and illustrates example components, functional capabilities and optional modules that may be included in a cloud-based contact center infrastructure solution. Customers 110 interact with a contact center 150 using voice, email, text, and web interfaces in order to communicate with agent(s) 120 through a network 130 and one or more of text or multimedia channels. The agent(s) 120 may be remote from the contact center 150 and handle communications (e.g., telephone calls, texts, and emails) with customers 110 on behalf of an enterprise. The agent(s) 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network. The network types are provided by way of example and are not intended to limit types of networks used for communications.

Agent(s) 120 and customers 110 may communicate with each other and with other services over the network 130. For example, with respect to voice calls, a customer calling on telephone handset may connect through the PSTN and terminate on a private branch exchange (PBX). A video communication originating from a tablet may connect through the network 130 terminate on the media server. A smartphone may connect via the WAN and terminate on an interactive voice response (IVR)/intelligent virtual agent (IVA) components. IVR are self-service voice tools that automate the handling of incoming and outgoing communications. Advanced IVRs use speech recognition technology to enable customers to interact with them by speaking instead of pushing buttons on their phones. IVR applications may be used to collect data, schedule callbacks and transfer communications to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. In yet another example, Social media, email, SMS/MMS, IM may communicate with their counterpart's application (not shown) within the contact center 150.

The contact center 150 itself be in a single location or may be cloud-based and distributed over a plurality of locations. The contact center 150 may include servers, databases, and other components. In particular, the contact center 150 may include, but is not limited to, a routing server, a SIP server, an outbound server, a reporting/dashboard server, automated call distribution (ACD), a computer telephony integration server (CTI), an email server, an IM server, a social server, a SMS server, and one or more databases for routing, historical information and campaigns.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered. Campaign management may be performed by an application to design, schedule, execute and manage outbound campaigns. Campaign management systems are also used to analyze campaign effectiveness.

For inbound SIP messages, the routing server may use statistical data from reporting/dashboard information and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

The integration of real-time and non-real-time communication services may be performed by unified communications (UC)/presence sever. Real-time communication services include Internet Protocol (IP) telephony, call control, instant messaging (IM)/chat, presence information, realtime video and data sharing. Non-real-time applications include voicemail, email, SMS and fax services. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

Recording applications may be used to capture and play back audio and screen interactions between customers and agents. Recording systems should capture everything that happens during interactions and what agents do on their desktops. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center. Reports are presented in narrative, graphical or tabular formats. Reports can be created on a historical or real-time basis, depending on the data collected by the contact center applications. Dashboards typically include widgets, gadgets, gauges, meters, switches, charts and graphs that allow role-based monitoring of agent, queue and contact center performance. Unified messaging (UM) applications include various messaging and communications media (voicemail, email, SMS, fax, video, etc.) stored in a common repository and accessed by users via multiple devices through a single unified interface.

In order to improve the routing of communications to agents 120, the communications (e.g., calls or any type of electronic communication) received by the contact center 150 may be routed to agents 120 by an agent routing platform 140. While shown in FIG. 1 as separate from the contact center 150, depending on the embodiment the agent routing platform 140 may be part of the contact center 150.

The agent routing platform 140 may route communications to agents 120 based on attributes associated with each agent 120, and one or more rules. As used herein an attribute may be a skill or characteristic associated with an agent 120. Examples of attributes may include language attributes (e.g., what languages that the agent speaks), work-related attributes (e.g., the agent 120 is trained to answer communications related to technical support, or billing, returns, shipping, etc.), and attributes representing any accolades or achievements that the agent 120 may have received (e.g., has the agent 120 been rewarded for providing excellent service). In some embodiments, each attribute may be associated with a proficiency score.

A rule for routing a communication may specify a plurality of required attributes and may provide a minimum proficiency score for one or more of the specified attributes. For example, a sample rule may specify that an agent 120 have an attribute of "technical support" and an attribute of "speaks Mandarin" with a proficiency level greater than or equal to four. A communication associated with such a rule may only be routed to an agent 120 that has the attribute "technical support" and speaks Mandarin with a proficiency level that is greater than or equal to four. In addition, a rule may also specify a maximum proficiency for one or more attributes. For example, a sample rule may specify that the agent 120 have a "technical support" attribute with a proficiency that is less than four. This type of rule may be used to ensure that there are agents 120 available for VIP customers or for calls where a high technical proficiency is required.

In some embodiments, the agent routing platform 140 may associate rules with customer categories and may route communications according to the customer category associated with a communication or customer. Examples of customer categories may include the language spoken by a customer, the country associated with a customer, the type of service requested by the customer (e.g., tech support or billing), and a priority associated with the customer (e.g., is the customer a VIP?).

Figure 2:
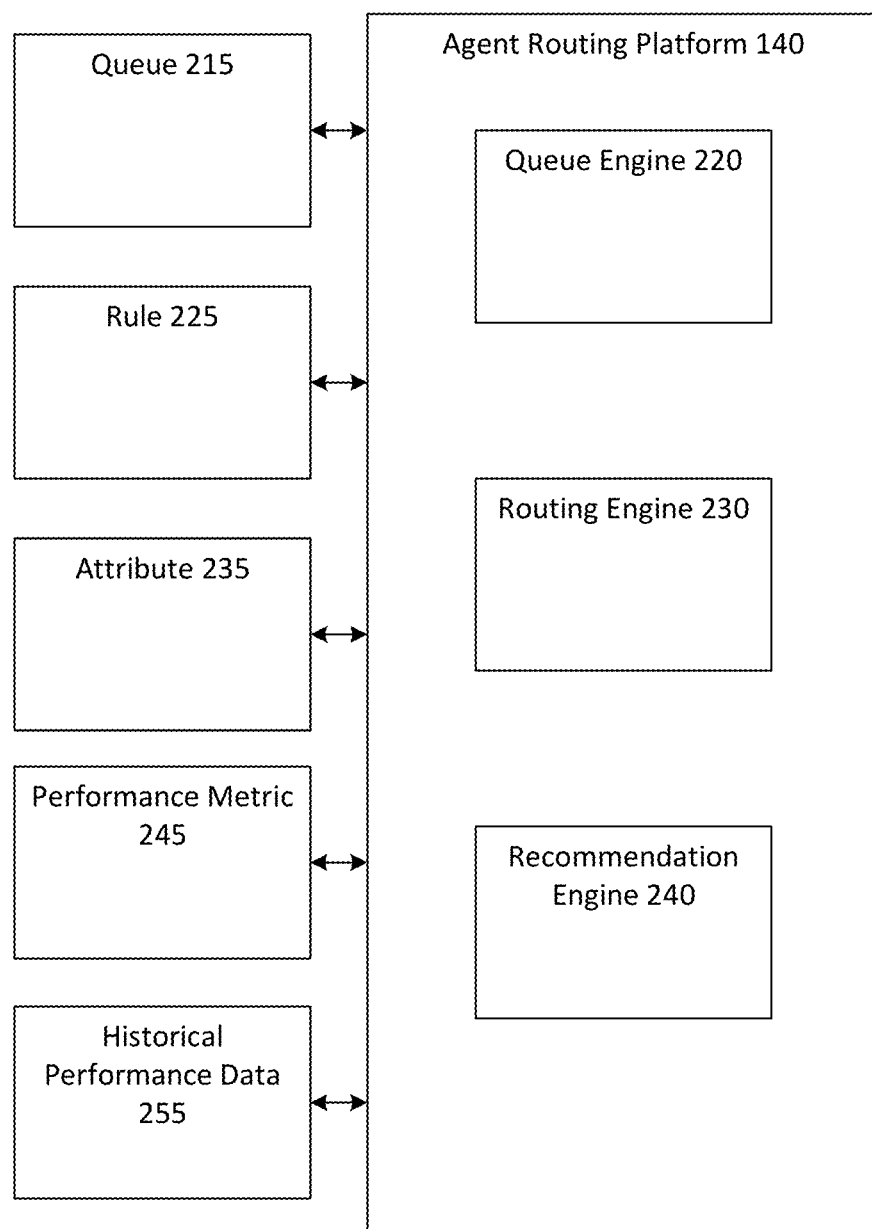
FIG. 2 is an illustration of an example agent routing platform.

FIG. 2 is an illustration of an example agent routing platform 140. As shown the agent routing platform 140 includes various modules including a queue engine 220, a routing engine 230, and a recommendation engine 240. More or fewer modules may be supported by the agent routing platform 140. Depending on the embodiment, each of the agent routing platform 140, queue engine 220, routing engine 230, and recommendation engine 240 may be implemented together or separately by one or more general purpose computing devices such as the computing system 900 illustrated with respect to FIG. 9.

The queue engine 220 may receive communications from customers 110 for a particular company, entity, or organization and may place the received communications in one or more queues 215. Each queue 215 for a company may be associated with a customer category, and the queue engine 220 may place the communications into the queues 215 based on the customer category associated with the communications. As used herein a customer category may be a set of characteristics that are associated with a customer 110 of a communication. The characteristics may include country of origin (i.e., what country is the communication coming from), language (i.e., what language is spoken by the customer 110), communication topic or purpose (i.e., what type of help is the customer seeking), and customer priority 110 (e.g., is the customer a VIP or does the customer pay for support). Other types of characteristics may be supported.

Depending on the embodiment, the queue engine 220 may determine the customer category for a communication using communication information indicating the country of origin associated with the communication and other communication routing information provided by the contact center 150. The queue engine 220 may further determine the customer category using IVR information associated with the communication. For example, the customer may have selected an option indicating the language that they speak (e.g., English or Spanish) and the type of information that they are seeking (e.g., tech support vs. billing). Depending on the embodiment, the received communication may include a customer number or identifier provided by the contact center 150 that may be used to determine the priority or VIP status of the caller and/or the customer category.

The routing engine 230 may, for each queue 215, route communications from the queue 215 to one or more agents 120 based on one or more rules 225 associated with the queue 215 and one or more attributes associated with each agent 120. The routing engine 230 may select a communication from a queue 215 and may retrieve one or more rules associated with the queue 215 and customer category. The routing engine 230 may retrieve the one or more rules 225 from a rule storage associated with the agent routing platform 140 and/or the contact center 150. Depending on the embodiment, if no rules 225 are associated with the customer category, the routing engine 230 may route the communication to any available agent 120. Alternatively, the routing engine 230 may select an agent 120 using a default or catchall rule 225. The default rule 225 may be set by a user or administrator, for example.

After retrieving the rules 225, the routing engine 230 may determine agents 120 that have attributes 235 that satisfy the rules 225. The routing engine 230 may retrieve the attributes 235 associated with each available agent 120 (i.e., an agent 120 that is not currently on a call or otherwise unavailable) and may determine available agents 120 that satisfy the rules 225. The routing engine 130 may then route the communication to one of the determined agents 120.

The routing engine 230 may continuously select communications from the queues 215 and may route the selected communications to agents 120 that have attributes 235 that satisfy the rules 225 associated with the queues 215. In some implementation, each queue 215 may have an instance of the routing engine 230 that routes communications to agents 120 based on the rules 225 associated with that queue 215.

The recommendation engine 240 may monitor one or more performance metrics 245 associated with each queue 215. A performance metric 245 may be any metric that can be used to measure the performance or overall success of a queue 215 with respect to routing communications to agents 120 and/or maintaining communication quality. Example performance metrics 245 may include average handling time (i.e., the average amount of time that it takes for a received communication to be completed by an agent 120), average wait time (i.e., the average amount of time that a communication waits to be received by an agent 120), service level, abandon rate (i.e., the number of communications that are abandoned before they are handled by an agent 120), and average customer satisfaction (i.e., an average based on responses to customer satisfaction surveys). Other performance metrics 245 may be supported.

In some embodiments, the performance metrics 245 may be based on a computer analysis of the communications between the customers 110 and the agents 120. For example, a model trained on a variety of previous agent 120 and customer 110 communications (e.g., trained using the audio data or transcripts of the communications) may generate scores or ratings for each communication from the queue 215 after its is handled by an agent 120.

The recommendation engine 240 may compare the performance metrics 245 against associated thresholds and may alert a user or administrator when a performance metric 245 fails to satisfy its associated threshold. A performance metric 245 may fail to satisfy its associated threshold when it falls bellow the associated threshold. For example, an administrator may set a threshold for a metric 245 such as average wait time for a queue 215 to be two minutes. If the average wait time for the queue 215 rises above two minutes, the recommendation engine 240 may alert the administrator.

In response to determining that a metric 245 does not satisfy a threshold, the recommendation engine 240 may further determine one or more ways to improve the performance of the queue 215. In some embodiments, the recommendation engine 240 may determine one or more attributes 235 of the rule 225 associated with the queue 215 to change to improve the performance of the queue 215. In particular, the recommendation engine 240 may determine one or more attributes 235 to remove from, or add to, the rule 225 to improve queue 215 performance. The recommendation engine 240 may also determine one or more attributes 235 whose associated proficiency level may be increased or decreased to improve queue 215 performance.

The attributes 235 and/or proficiency levels determined by the recommendation engine 240 to improve performance may depend on the performance metric 245 whose threshold is not satisfied. For example, if a performance metric 245 such as average wait time is greater than the associated threshold, then the recommendation engine 240 may determine to relax one or more attributes 235 and proficiency levels to increase the number of agents 120 that will be eligible to receive communications for the queue 215. As another example, if a performance metric 245 such as customer satisfaction is below the associated threshold, the recommendation engine 240 may determine to increase one or more attributes 235 and proficiency levels to hopefully increase the quality of the agents 120 that handle communications for the queue 215.

For performance metrics 245 that are related to the number of agents 120 that can handle communications for the queue 215 such as average wait time, abandonment rate, and average handling time, the recommendation engine 240 may determine the number of agents 120 of the contact center 150 and/or agent routing platform 140 that can handle communications for the queue 215 based on the rule 225 associated with the queue 215 and the attributes 235 (and proficiency levels) associated with each agent 120. The recommendation engine 240 may then determine which attributes 235 (and proficiency levels) of the rule 225, which if changed or removed from the rule 225, would result in an increase in the number of available agents 120 for the queue 125. The recommendation engine 240 may then recommend the determined change to the rule 225 to the administrator who can approve or reject the change.

In some embodiments, the recommendation engine 240 may recommend changes to the rule 225 associated with a queue 215 to improve performance of one or more metrics 245 using what is referred to as historical performance data 255. The historical performance data 255 may include data collected about each queue 215 over time including, but not limited to, the number of communications added to the queue 215, the agents 120 that handled communications for the queue 215 including their associated attributes 235 and proficiency levels, rules 225 used to route communications for the queue 215, and the various performance metrics 245 that were observed for the queue 215. The performance metrics 245 may include performance metrics 245 related to the performance of the queue 215 (e.g., average hold time and abandonment rate) and performance metrics 245 related to the agents 120 that handled communications for the queue 215 (e.g., customer satisfaction surveys).

The recommendation engine 230 when determining which attribute or proficiency level to change for a rule 225 of a queue 215 to increase queue 215 performance may use the historical performance data 255. For example, if the recommendation engine 230 wants to improve the customer satisfactions scores of the agents 120 that handle communications for the queue 215, the recommendation engine 230 may use the historical performance data 255 to determine the particular attributes 235 and proficiency levels that may be associated with improved customer satisfaction scores. The recommendation engine 230 may consider historical performance data 255 from queues 215 associated with similar customer categories, rules 225, and sector or business area of the company associated with the queue 215.

In some embodiments, when determining an attribute 235 or proficiency level to change for a rule 225 of a queue to correct a particular performance metric 245, the recommendation engine 240 may ensure that it does not inadvertently cause another performance metric 245 to fall short of its associated threshold. For example, the recommendation engine 240 may determine attributes 235 to change for a rule 225 of a queue 215 in response to the average wait time exceeding a threshold. The recommendation engine 240 may determine that reducing the proficiency level of the attribute 235 "English Proficiency" from 4 to 3 or reducing the proficiency level of the attribute 235 "Technical Proficiency" from 5 to 4. The recommendation engine 240 may want to select the attribute 235 to recommend changing that results in the least overall decrease in the customer satisfaction scores as a result of the change.

Accordingly, when determining an attribute 235 or proficiency level to change, the recommendation engine 240 may also use the historical performance data 255 to determine which attribute 235 or proficiency level when changed will have the least overall effect on other performance metrics 245 when changed. In particular, the recommendation engine 240 may use the historical performance data 255 to ensure that when a change is made to an attribute 235 associated with a rule 225 in response to a performance metric 245 exceeding (or falling below) a threshold, no other performance metrics 245 will exceed (or fall below) their associated thresholds.

Depending on the embodiment, the historical performance data 255 may be used to train a model (i.e., artificial intelligence) that can predict the performance metrics 245 for a queue 215 based on criteria such as the available agents 120 and associated attributes 235, the rule 225 used for the queue 215, a sector or business associated with the queue 215, and a current communication volume received by a contact center, for example. The recommendation engine 240 may then use the model to recommend changes to a rule 225 for a queue that maximizes some or all of the performance metrics 245 associated with a queue 215.

In some embodiments, the recommendation engine 230 may gradually expand the attributes 235 of a rule 225 in order to meet the performance metrics 245 of the queue 215. After each new attribute 235 is added to the rule 225 the recommendation engine 230 may determine if the performance metrics 245 of the queue 215 are satisfied after some amount of time has passed. If not, the recommendation engine 230 may continue to add attributes 235 until the performance metrics 245 are satisfied. Depending on the embodiment, the particular attributes 235 that are added may be selected by the recommendation engine 230 using the model. In addition, the amount of time that the recommendation engine 230 waits before adding another attribute 235 may be increased after each expansion.

For example, a consider a hypothetical queue 215 called "Sales East". Initially, the queue 215 may be created with a rule 225 that requires agents 120 to have the attribute 235 of "SalesEast". After twenty seconds, if the performance metrics 245 are not satisfied, the recommendation engine 230 may expand the rule 225 by adding the attribute 235 of "SalesCenter". Thus, the rule 225 may be "SalesEast" OR "SalesCenter". After thirty second, if the performance metrics 245 are not satisfied, the recommendation engine 230 may further expand the rule 225 by adding the attribute 235 of "SalesWest". Thus, the rule 225 may be "SalesEast" OR "SalesCenter" OR "SalesWest". The recommendation engine 230 may continue adding new attributes 235 to the rule 225 until the performance metrics 245 are satisfied.

In some embodiments, the recommendation engine 230 may further gradually relax the required proficiency level of the attributes 235 of a rule 225 associated with a queue 215 (or even remove an attribute 235 from the rule 255) in order to meet the performance metrics 245 of the queue 215. After each proficiency level is relaxed, the recommendation engine 230 may determine if the performance metrics 245 of the queue 215 are satisfied after some amount of time has passed. If not, the recommendation engine 230 may continue to relax proficiency levels until the performance metrics 245 are satisfied. In addition, rather than relaxing the proficiency level of an attribute 235, the recommendation engine 230 may determine to completely remove the attribute 235 from the rule 255. Depending on the embodiment, the particular attributes 235 whose proficiency levels are relaxed (or removed) may be selected by the recommendation engine 230 using the model. In addition, the amount of time that the recommendation engine 230 waits before relaxing each proficiency level may be increased after each relaxation.

For example, a consider a hypothetical queue 215 called "Spanish Support". Initially, the queue 215 may be created with a rule 225 that requires agents 120 to have the attribute 235 of "Spanish" and the attribute 235 of "Support" at the highest proficiency levels or "Spanish-High" AND "Support-High" After sixty seconds, if the performance metrics 245 are not satisfied, the recommendation engine 230 may reduce the proficiency levels of the attributes to medium. Thus, the rule 225 may become "Spanish-Medium" AND "Support-Medium". After another sixty seconds, if the performance metrics 245 are not satisfied, the recommendation engine 230 may further relax the rule 225 by removing the attribute "Support-Medium" from the rule 225. Thus, the relaxed rule 225 may be "Spanish-Medium". The recommendation engine 230 may continue relaxing or removing attributes 235 from the rule 225 until the performance metrics 245 are satisfied.

Figure 3:
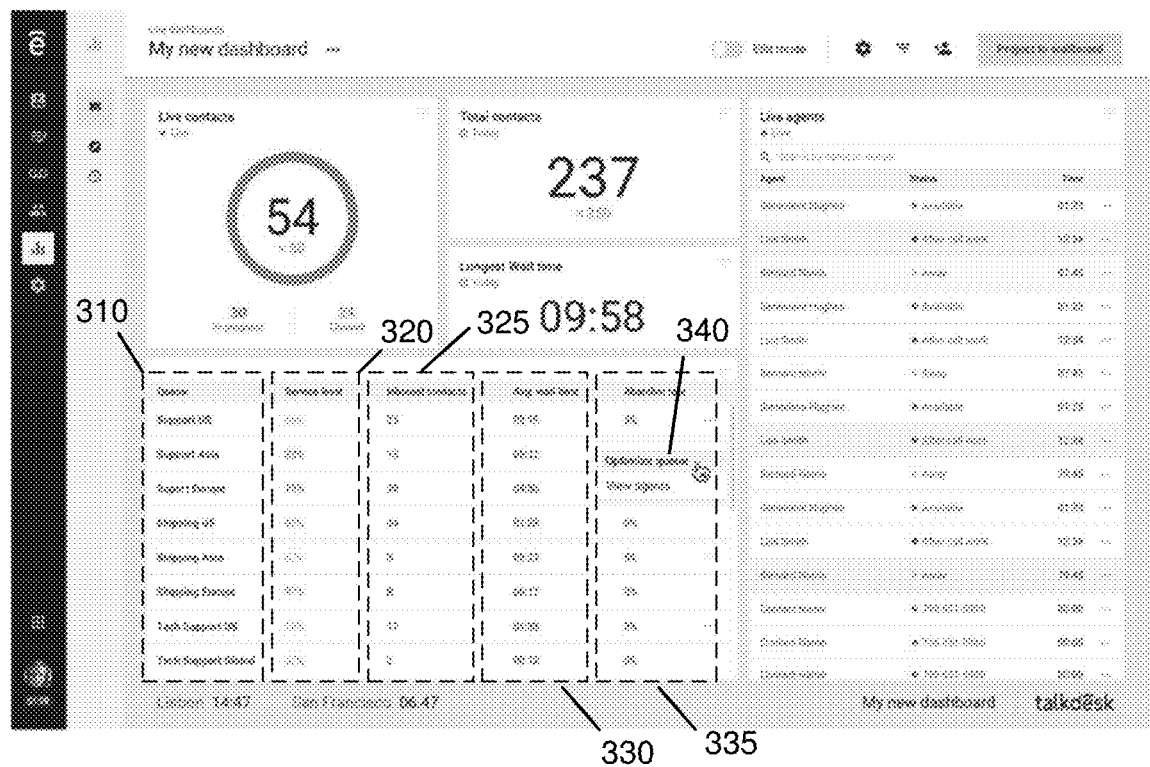
FIGS. 3-7 are illustrations of example graphical user interfaces.

FIG. 3 is an illustration of GUI 300 that may be used by an administrator to view information about one or more queues 215 including performance metrics 245. The box 310 shows a plurality of queues 215 that are monitored by an administrator. The boxes 320, 325, 330, and 340 show a variety of performance metrics 245 for each of the queues 215 shown in the box 310. In particular, the box 320 shows the service level measured for each queue 215. The box 325 shows the number of inbound contacts associated with each queue 215 (i.e., how many customers 110 are waiting in each queue 215). The box 330 shows the average wait time for each queue 215. The box 340 shows the abandon rate associated with each queue 215.

At some point, the administrator or recommendation engine 240 may have determined that the performance metric 245 "Service level" for the queue 215 called "Support Asia" has fallen below a threshold. In response, as shown in the menu 340, the administrator has selected a menu option to optimize the "Support Asia" queue 215. Depending on the embodiment, the menu option may have been displayed to the administrator in the GUI 300 by the recommendation engine 240 after determining that the "Service level" metric 245 fell below the threshold.

Figure 4:
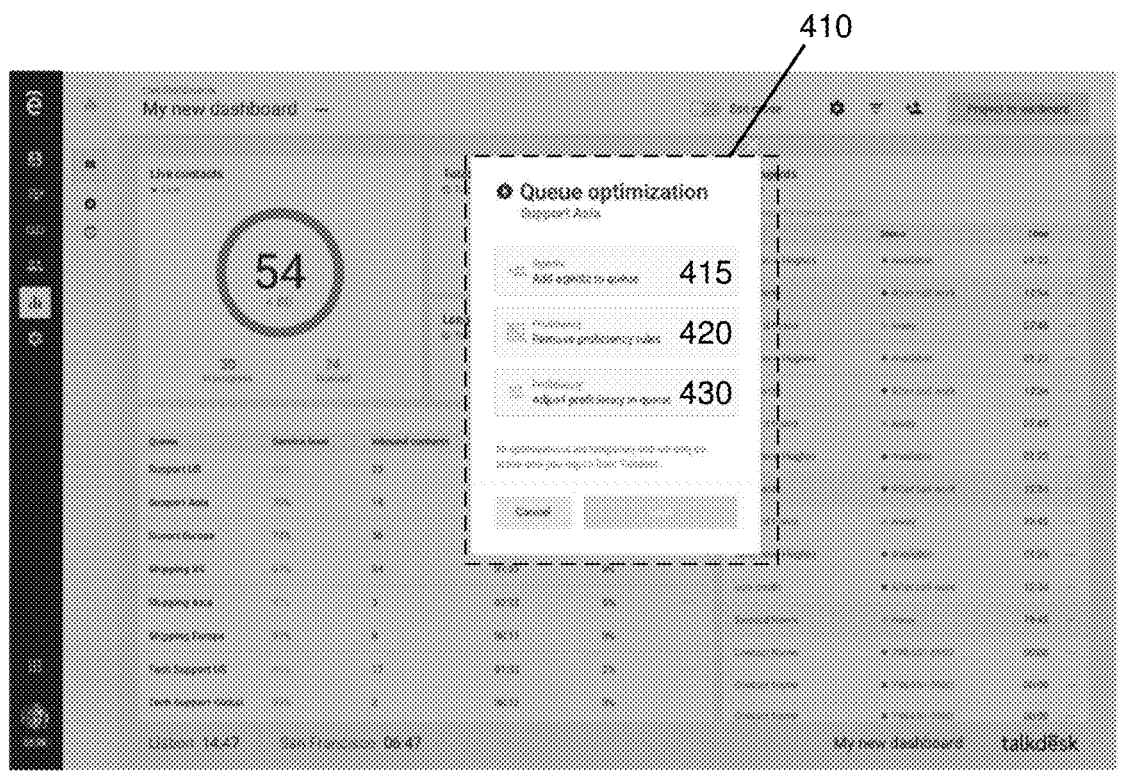

Continuing to FIG. 4, in response to the administrator electing to optimize the queue 215, a new window has been displayed in the GUI 300. As shown in the box 410, the window includes several options that the administrator may select to optimize or improve the performance of the queue 215. These options include adding agents 120 to the queue 215 (i.e., the button 415), removing one or more rules 225 associated with the queue 215 (i.e., the button 420), and adjusting one or more attributes 235 or proficiency levels associated with the queue 215 (i.e., the button 430).

Figure 5:
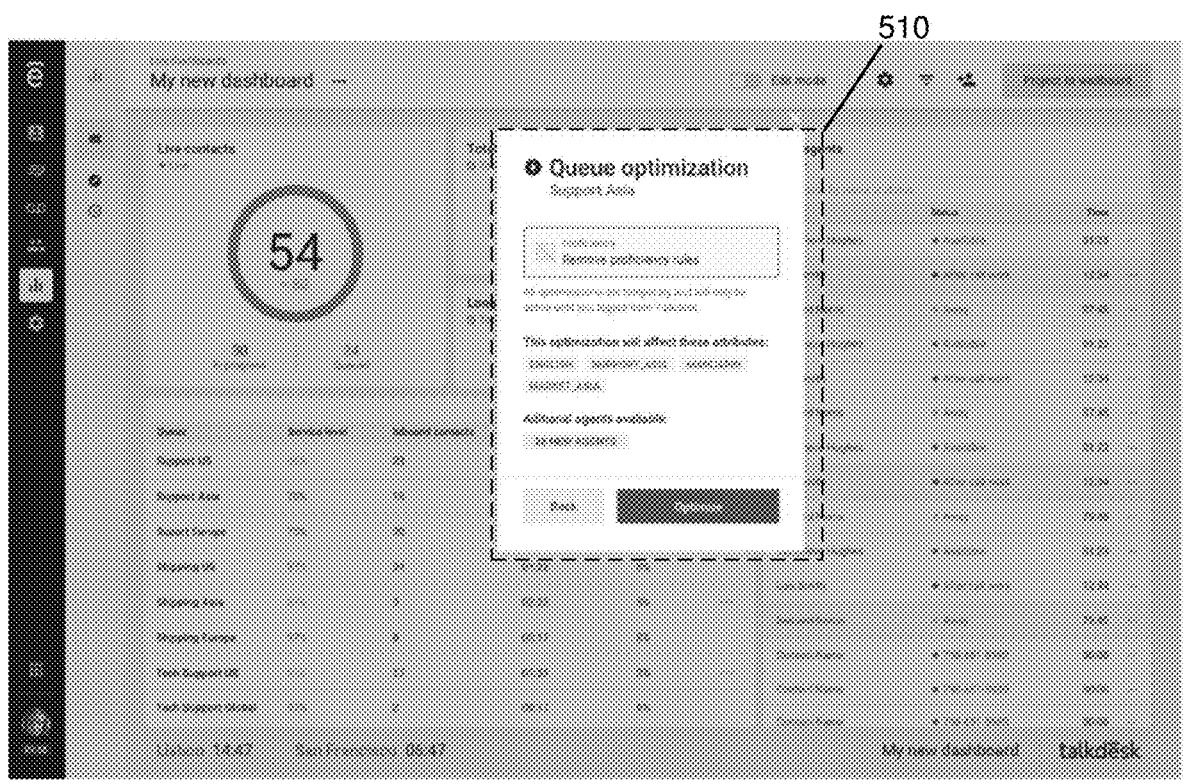

Continuing to FIG. 5, the administrator has selected the button 420 indicating that they would like to remove a rule 225 associate with the queue 215. In response, a new window has been displayed in the GUI 300. As shown in the box 510, the window indicates the attributes 235 that will be affected by removing the rule 225 include the attributes 235 of "ENGLISH", "SUPPORT_ASIA", "MANDARIN", and "MARKET_ASIA". The window also indicates that removing the rule 225 will increase the number of agents 120 that can handle communications from the queue 215 by 25 agents 120.

Figure 6:
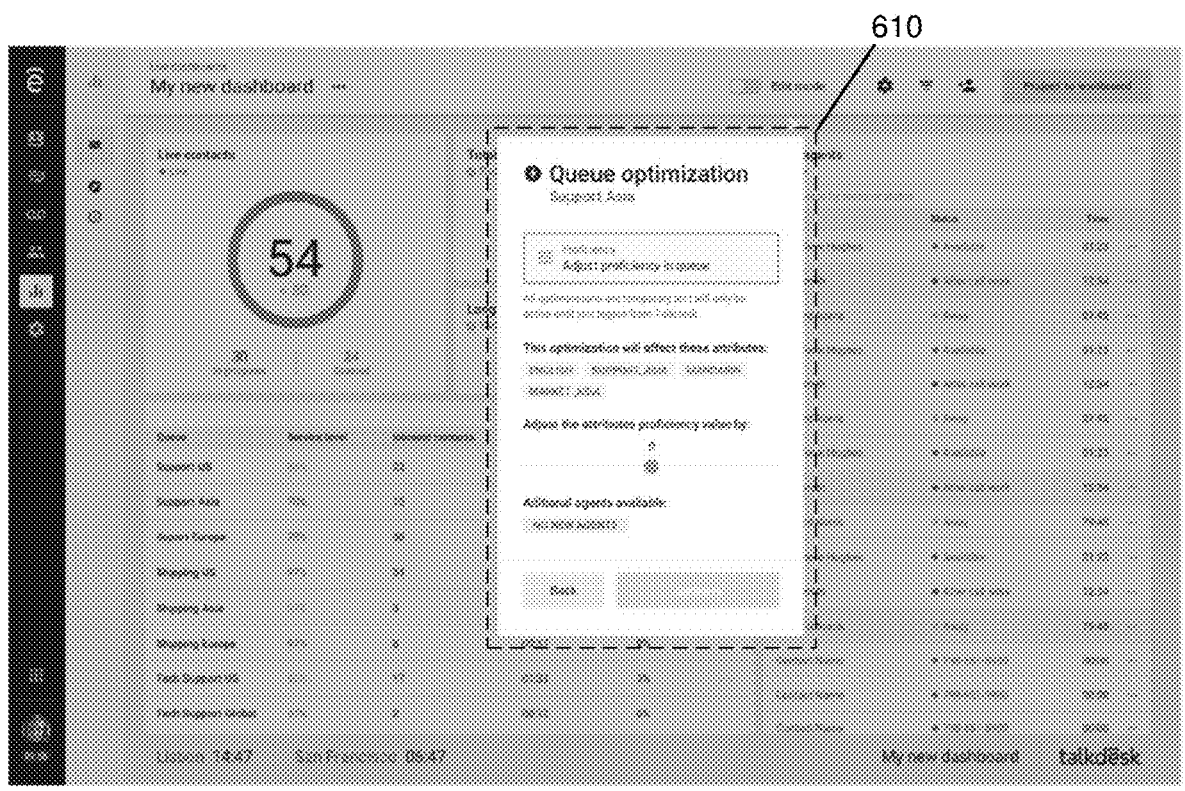

Continuing to FIG. 6, the administrator has instead determined to change the proficiency level of one or more attributes 235 rather than remove the rule 225. In response, a new window has been displayed in the GUI 300. As shown in the box 610, the window indicates the attributes 235 whose proficiency level can be changed include the attributes 235 of "ENGLISH", "SUPPORT_ASIA", "MANDARIN", and "MARKET_ASIA". The window also includes a slider that can be used to increase or decrease the proficiency level of some or all of the attributes 235. Because no proficiency levels have been adjusted, the window indicates that no changes to the total number of agents 120 that can handle communications have been made.

Figure 7:
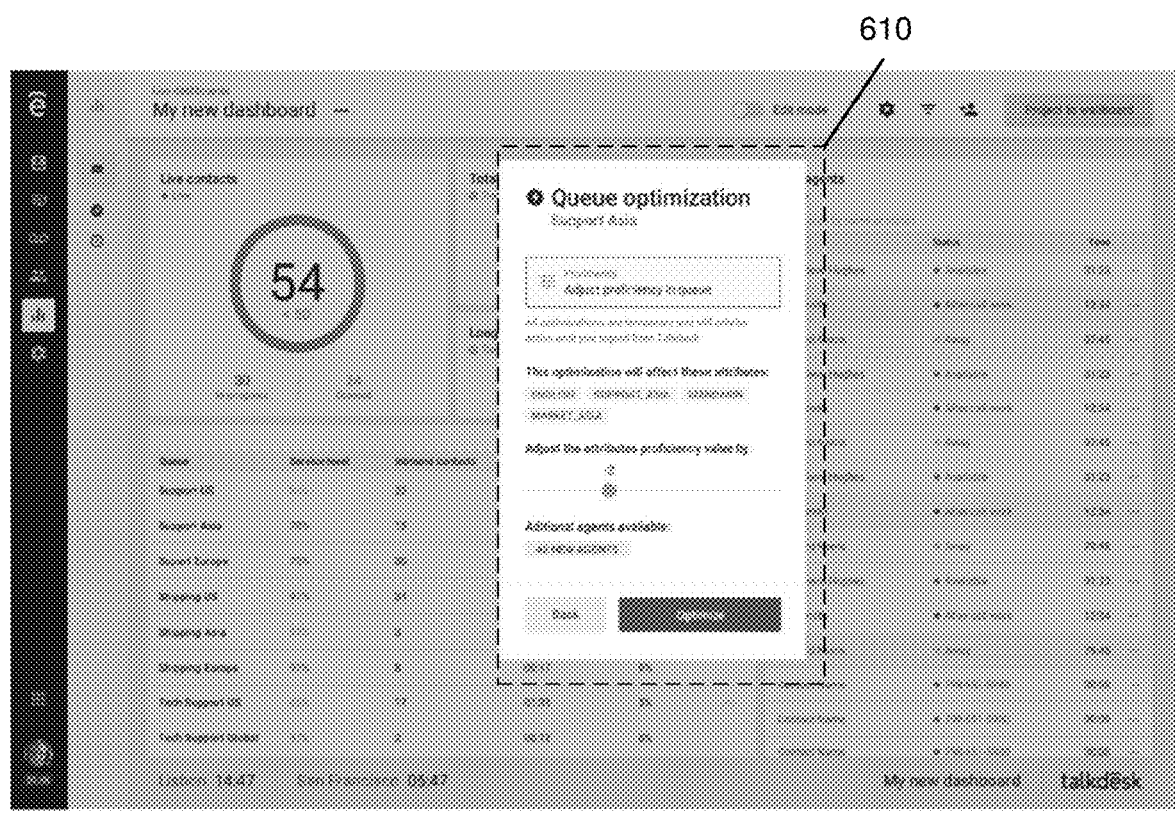

Continuing to FIG. 7, as shown in the box 610, the administrator has determined to reduce the proficiency level of at least one of the attributes 235 associated with the rule 225 used by the queue 215 to place communications with agents 120. In particular, the administrator has moved the slider to the left to reduce each attribute 235 by 2 (i.e., −2). Accordingly, the window shows that the reduction has resulted in 42 new agents being available to handle the communications for the queue 215.

Figure 8:
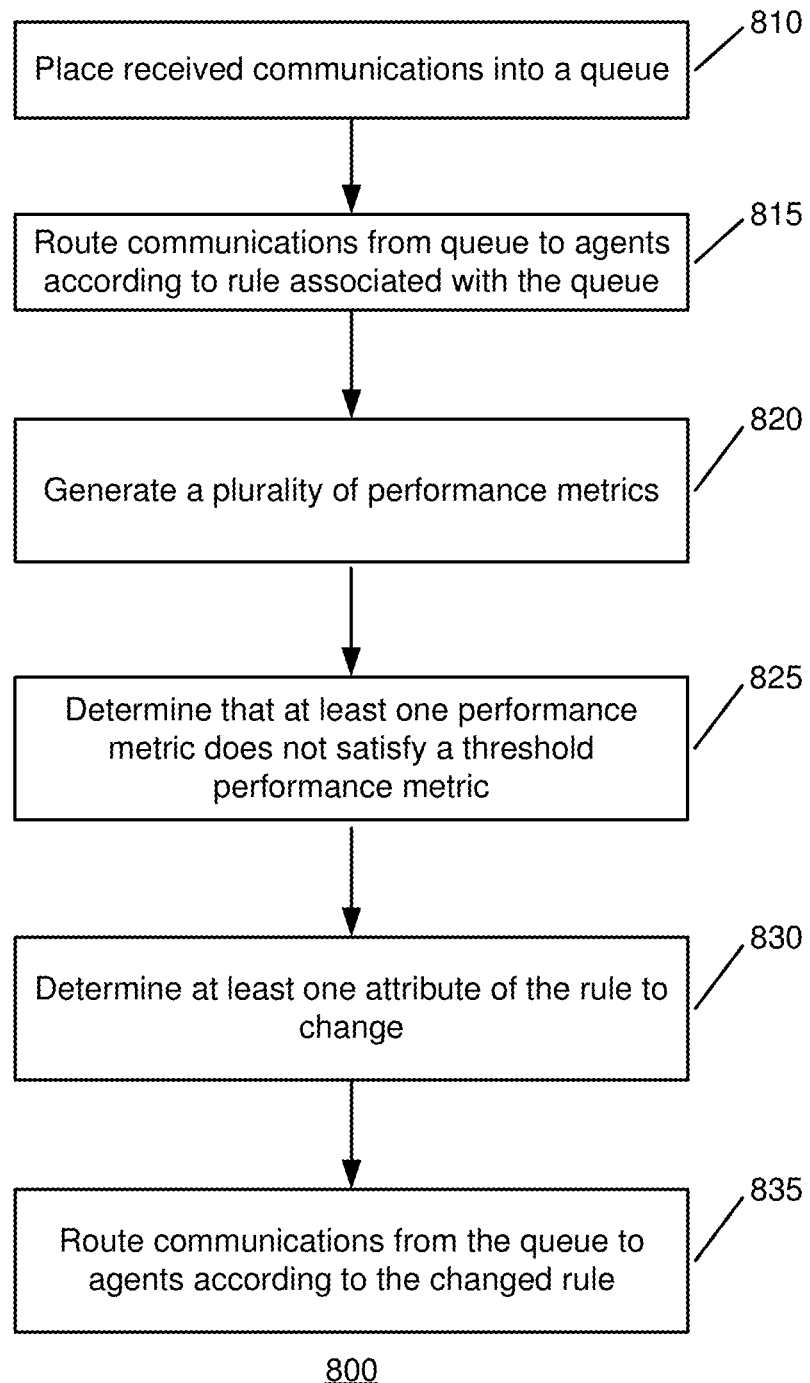
FIG. 8 is an illustration of an example method for optimizing one or more attributes of a rule to improve one or more performance metrics.

FIG. 8 is an illustration of an example method 800 for optimizing one or more attributes of a rule 225 to improve one or more performance metrics 245. The method 800 may be implemented by the agent routing platform 140.

At 810, received communications are placed in a queue. The received communications may be placed into a queue by the queue engine 220 of the agent routing platform 140. The communications may be placed in the queue 215 based on the customer category associated with each queue 215. The communications may include calls, emails, texts, or any other type of electronic communication.

At 815, communications from the queue are routed to agents according to a rule associated with the queue. The communications may be routed by the routing engine 230 of the agent routing platform 140. The rule 225 may include one or more attributes 230 and each attribute 235 may include a proficiency level. The routing engine 230 may route the communications to agents 120 whose attributes 225 and proficiency levels satisfy the rule 225 associated with the queue 215.

At 820, a plurality of performance metrics is generated. The performance metrics 245 may be generated by the recommendation engine 240 of the agent routing platform 140. The performance metrics 245 may include average communication handling time, customer 110 satisfaction, average wait time, service level, and abandonment rate. Other performance metrics 245 may be considered.

At 825, that at least one performance metric does not satisfy a threshold performance metric is determined. The determination may be made by the recommendation engine 240 of the agent routing platform 140. Some or all of the performance metrics 245 may be associated with a threshold performance metric 245 that is set by an administrator. A threshold performance metric may be satisfied when its associated performance metric 245 stays below (or above) the threshold performance metric.

At 830, at least one attribute of the rule to change is determined. The at least one attribute 235 may be determined by the recommendation engine 240 of the agent routing platform 140. Depending on the particular performance metric 240 that did not satisfy the associated threshold performance metric, the recommendation engine 240 may recommend changing an at least one attribute 235 that increases the number of agents 120 that can handle communications for the queue 215. Alternatively or additionally, the recommendation engine 240 may recommend changing at least one attribute 235 based on the historical performance data 255. Other methods may be used.

At 835, communications from the queue are routed according to the changed rule. The communications may be routed to agents 120 according to the rule 225 with the changed at least one attribute 235. In some embodiments, the performance metrics 245 may be continued to be generated to determine if the change to the rule 225 results in any changes to the performance metrics 245 including the performance metric 245 that previously did not satisfy the associated performance metric threshold.

Figure 9:
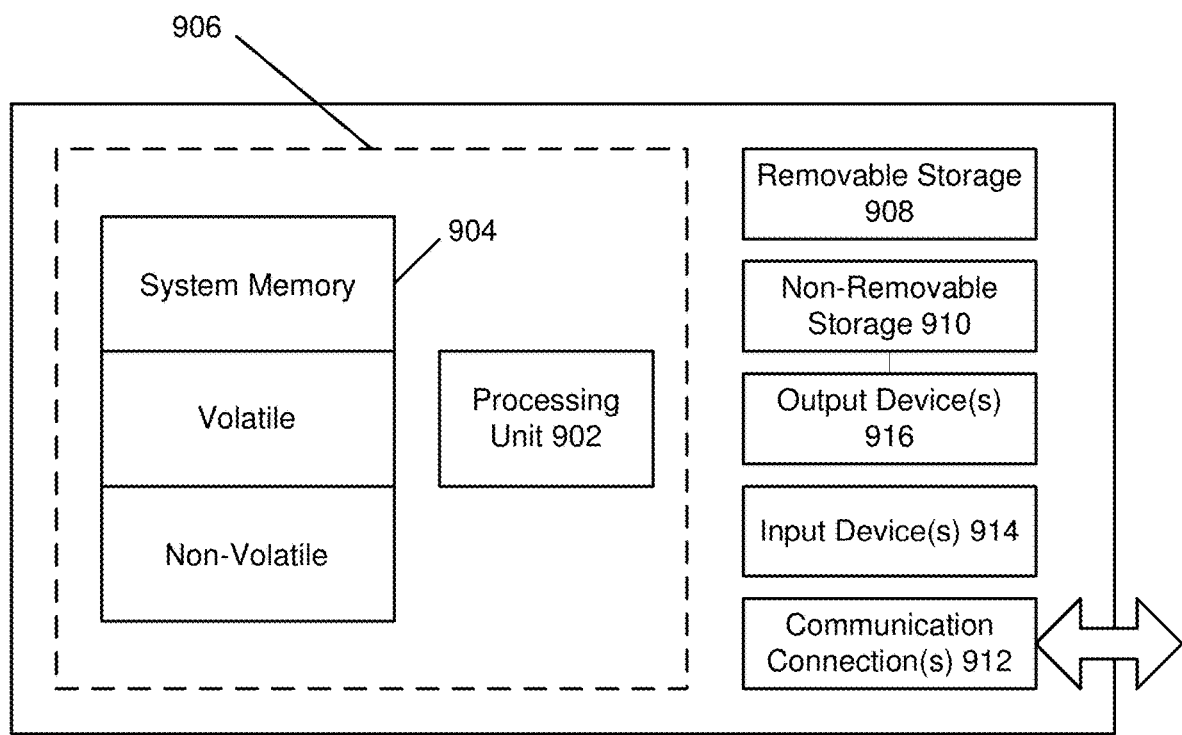
FIG. 9 illustrates an example computing device.

FIG. 9 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used.

Examples of well-known computing systems, environments, and/or configurations that may be suitable for use include, but are not limited to, personal computers, servers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of tangible computer readable media. Computer readable media can be any available tangible media that can be accessed by device 900 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communications connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving an indication that at least one performance metric of a plurality of performance metrics for a contact center does not satisfy a threshold performance metric by a computing device, wherein the contact center routes received communications to agents of a plurality of agents according to a rule associated with the contact center, and further wherein the rule specifies a plurality of attributes of agents of a plurality of agents that may handle communications for the contact center;
in response to the indication, retrieving historical performance data by the computing device;
determining at least one attribute of the plurality of attributes of the rule to change based on the historical performance data by the computing device; and
providing an instruction to the contact center to change the at least one attribute by the computing device.

2. The method of claim 1, wherein each attribute of the plurality of attributes is associated with a proficiency level and determining the at least one attribute of the plurality of attributes of the rule to change comprises determining the proficiency level of the at least one attribute of the plurality of attributes of the rule to change.

3. The method of claim 1, wherein the at least one performance metric comprises one or more of service level, wait time, and abandon rate.

4. The method of claim 1, wherein the attributes of the plurality of attributes comprises language attributes and skill attributes.

5. The method of claim 3, wherein the change comprises lowering the proficiency level.

6. The method of claim 1, wherein the historical performance data is associated with the plurality of agents.

7. The method of claim 1, wherein the historical performance data is associated with the contact center.

8. A system comprising:
- at least one processor; and
- a non-transitory computer readable medium comprising instructions that, when executed by the at least one processor, cause the system to:
  - receive an indication that at least one performance metric of a plurality of performance metrics for a contact center does not satisfy a threshold performance metric, wherein the contact center routes received communications to agents of a plurality of agents according to a rule associated with the contact center, and further wherein the rule specifies a plurality of attributes of agents of a plurality of agents that may handle communications for the contact center;
  - in response to the indication, retrieve historical performance;
  - determine at least one attribute of the plurality of attributes of the rule to change based on the historical performance data; and
  - provide an instruction to the contact center to change the at least one attribute.

9. The system of claim 8, wherein each attribute of the plurality of attributes is associated with a proficiency level and determining the at least one attribute of the plurality of attributes of the rule to change comprises determining the proficiency level of the at least one attribute of the plurality of attributes of the rule to change.

10. The system of claim 9, wherein the change comprises lowering the proficiency level.

11. The system of claim 8, wherein the attributes of the plurality of attributes comprises language attributes and skill attributes.

12. The system of claim 8, wherein the at least one performance metric comprises one or more of service level, wait time, and abandon rate.

13. The system of claim 8, wherein the historical performance data is associated with the plurality of agents.

14. The system of claim 8, wherein the historical performance data is associated with the contact center.

15. A non-transitory computer-readable medium comprising instructions that, when executed by at least one processor, cause a computer system to:
- receive an indication that at least one performance metric of a plurality of performance metrics for a contact center does not satisfy a threshold performance metric, wherein the contact center routes received communications to agents of a plurality of agents according to a rule associated with the contact center, and further wherein the rule specifies a plurality of attributes of agents of a plurality of agents that may handle communications for the contact center;
- in response to the indication, retrieve historical performance;
- determine at least one attribute of the plurality of attributes of the rule to change based on the historical performance data; and
- provide an instruction to the contact center to change the at least one attribute.

16. The computer-readable medium of claim 15, wherein each attribute of the plurality of attributes is associated with a proficiency level and determining the at least one attribute of the plurality of attributes of the rule to change comprises determining the proficiency level of the at least one attribute of the plurality of attributes of the rule to change.

17. The computer-readable medium of claim 16, wherein the change comprises lowering the proficiency level.

18. The computer-readable medium of claim 15, wherein the attributes of the plurality of attributes comprises language attributes and skill attributes.

19. The computer-readable medium of claim 15, wherein the at least one performance metric comprises one or more of service level, wait time, and abandon rate.

20. The computer-readable medium of claim 15, wherein the historical performance data is associated with the plurality of agents.

* * * * *